United States Patent
Vallamkondu et al.

(10) Patent No.: US 11,549,390 B2
(45) Date of Patent: Jan. 10, 2023

(54) HEALTH-MONITORING SYSTEM FOR DETERMINING ROTATION FREQUENCY OF A SHAFT

(71) Applicant: Rosemount Aerospace Inc., Burnsville, MN (US)

(72) Inventors: Aswin Kumar Vallamkondu, Banglore (IN); Ramesh Annamareddy, Banglore (IN); Magdi A. Essawy, Lakeville, MN (US); Dennis A. Quy, Apple Valley, MN (US)

(*) Notice: Subject to any disclaimer, the term of this patent is extended or adjusted under 35 U.S.C. 154(b) by 0 days.

(21) Appl. No.: 17/451,431

(22) Filed: Oct. 19, 2021

(65) Prior Publication Data
US 2022/0220860 A1 Jul. 14, 2022

(30) Foreign Application Priority Data
Jan. 9, 2021 (IN) .............................. 202141001080

(51) Int. Cl.
*F01D 21/00* (2006.01)
*G01P 3/48* (2006.01)
(Continued)

(52) U.S. Cl.
CPC ............ *F01D 21/003* (2013.01); *G01P 3/487* (2013.01); *G01P 3/489* (2013.01);
(Continued)

(58) Field of Classification Search
CPC ........ F01D 21/003; F01D 17/02; F01D 17/06; F05D 2260/80; F05D 2270/304;
(Continued)

(56) References Cited

U.S. PATENT DOCUMENTS 5,493,214 A 2/1996 Good et al.
6,274,991 B1* 8/2001 Busch .................. H02P 7/2805
                                                                318/434
(Continued)

FOREIGN PATENT DOCUMENTS

CN    102928472 A    2/2013
CN    210269201 U    4/2020
EP       732593 B1   3/2000

OTHER PUBLICATIONS

Extended European Search Report dated Jun. 1, 2022, for corresponding European Application No. 22150140.6.

*Primary Examiner* — Audrey B. Walter
*Assistant Examiner* — Dapinder Singh
(74) *Attorney, Agent, or Firm* — Kinney & Lange, P.A.

(57) ABSTRACT

Apparatus and associated methods relate to health-monitoring of a magnetic speed probe. An inductive coil of the magnetic speed probe is used for two purposes: i) to sense a changing magnetic field caused by rotation of a rotating member; and ii) to radiatively transmit radio-frequency signals for determining the health of the magnetic speed probe. A signal generator coupled to the inductive coil of the magnetic speed probe generates the radio-frequency signals that, when conducted by the inductive coil, causes an inductive coil to act as a radio transmitter by radiatively transmitting the radio-frequency signals. The radio-frequency signals transmitted by the inductive coil are detected by a radio receiver. The radio-frequency signals received are indicative of health of the magnetic speed probe.

20 Claims, 5 Drawing Sheets

(51) Int. Cl.
　　　*G01P 3/487*　　　(2006.01)
　　　*G01P 3/489*　　　(2006.01)
(52) U.S. Cl.
　　　CPC .... *F05D 2260/80* (2013.01); *F05D 2270/304* (2013.01); *F05D 2270/821* (2013.01)
(58) Field of Classification Search
　　　CPC ........... F05D 2270/821; F05D 2270/80; F05D 2220/323; G01P 21/02; G01P 3/487; G01P 3/488; G01P 3/489
　　　See application file for complete search history.

(56) References Cited

U.S. PATENT DOCUMENTS

| | | |
|---|---|---|
| 6,573,676 B1 * | 6/2003 | Klesing ................ H02H 7/0851 318/434 |
| 9,465,077 B2 | 10/2016 | Love et al. |
| 9,797,993 B2 | 10/2017 | Pauly et al. |
| 9,919,812 B2 | 3/2018 | Shi |
| 10,151,785 B2 | 12/2018 | Essawy et al. |
| 10,190,440 B2 | 1/2019 | Argote et al. |
| 2018/0275183 A1 | 9/2018 | Essawy et al. |
| 2020/0217824 A1 | 7/2020 | Jha et al. |
| 2021/0301679 A1 * | 9/2021 | Calderon ................ F01D 21/14 |

* cited by examiner

FIG. 4

HEALTH-MONITORING SYSTEM FOR DETERMINING ROTATION FREQUENCY OF A SHAFT

BACKGROUND

Magnetic speed sensors are used in a variety of apparatus and for a variety of purposes. Some environments in which a magnetic speed sensor is used can present harsh chemicals, high temperatures, abrasive atmospheres, etc. Such challenging environments can cause degradation of some components of the magnetic speed sensor so situated. For example, aircraft engines can be equipped with such magnetic speed sensors for measuring the rotational speed of a shaft thereof. Such magnetic speed sensors can be exposed to very high temperatures, abrasive and/or reactive elements in the atmosphere where the magnetic speed sensor is located. Behavior of such magnetic speed sensors can change in response to exposure to such a challenging environment.

SUMMARY

Apparatus and associated methods relate to a health-monitoring system for determining rotation frequency of a rotatable member. The system includes a magnetic speed probe and a speed-probe monitor. The magnetic speed probe includes a magnet, an inductive coil, and a sensing circuit. The magnet generates a magnetic field proximate the rotatable member. Rotation of the rotatable member causes changes in the magnetic field generated by the magnet. The inductive coil is positioned proximate the rotatable member. The changes in the magnetic field induces a coil current within the inductive coil. The sensing circuit is coupled to the inductive coil. The sensing system generates, in response to the coil current, a signal indicative of rotation frequency of the rotatable member. The speed-probe monitor includes a signal generator, a radio receiver, and a health monitor. The signal generator is coupled to the inductive coil of the magnetic speed probe. The signal generator generates radio-frequency signals that, when conducted by the inductive coil, causes the inductive coil to act as a radio transmitter that radiatively transmits the radio-frequency signals. The radio receiver receives the radio-frequency signals radiatively transmitted by the inductive coil. The health monitor determines health of the magnetic speed probe based on the radio-frequency signals received.

Some embodiments relate to a health-monitoring method for determining rotation frequency of a rotatable member. The method generates, via a magnet, a magnetic field proximate the rotatable member. The method causes, via rotation of the rotatable member, changes in the magnetic field generated by the magnet. The method positions an inductive coil proximate the rotatable member so as to sense changes in the magnetic field. The method induces, via the changes in the magnetic field sensed, a coil current within the inductive coil. The method generates, in response to the coil current induced, a signal indicative of the rotation frequency of the rotatable member. The method generates, via a signal generator coupled to the inductive coil, radio-frequency signals that, when conducted by the inductive coil, causes the inductive coil to act as a radio transmitter that radiatively transmits the radio-frequency signal. The method receives, via a radio receiver, the radio-frequency signals radiatively transmitted by the inductive coil. The method also determines, via a health monitor, health of the magnetic speed probe based on the radio-frequency signals received.

DETAILED DESCRIPTION

Apparatus and associated methods relate to health-monitoring of a magnetic speed probe. Such health-monitoring magnetic speed probes determines rotation frequency of a rotating member and health of the magnetic speed probe. Rotation frequency of the rotating member is determined by generating a magnetic field proximate the rotatable member and sensing changes to the magnetic field that are caused by rotation of the rotating member. A magnet generates a magnetic field proximate the rotatable member (e.g., a substantially constant magnetic field). Rotation of the rotatable member causing changes in the magnetic field that is incident upon an inductive coil. Such changes in the magnetic field are indicative of rotation frequency of the rotating member. For example, such changes in the magnetic field can have a periodicity that is proportional to the rotation frequency of the rotating member. The inductive coil is located proximate the rotating member. Changes in the magnetic field induce a coil current within the inductive coil. A sensing circuit is coupled to the inductive coil. The sensing circuit generates a signal indicative of rotation frequency of the rotatable member in response to the coil current induced within the inductive coil.

Health of the magnetic speed probe is determined by using the inductive coil as a radio transmitter. A signal generator is coupled to the inductive coil of the magnetic speed probe. The signal generator generates a sweep of radio-frequency signals of known magnitude. The sweep of radio-frequency signals generated are then conducted within the inductive coil, which causes the inductive coil to act as a radio transmitter that radiatively transmits the sweep of radio-frequency signals conducted therewithin. A radio receiver is configured to receive the radio-frequency signals radiatively transmitted by the inductive coil. Health of the magnetic speed probe can be ascertained based on comparing a resonant frequency of the magnetic speed probe with a reference resonant frequency (e.g., a resonant frequency determined at a previous time). Such a resonant frequency can be determined by finding the frequency within the sweep of radio-frequency signals at which the maximum power was transmitted by the inductive coil.

A health monitor determines health of the magnetic speed probe based on the sweep of radio-frequency signals received. Any degradation of the inductive coil or degradation to any other electrical components coupled thereto can result in changes to the electrical parameters associated therewith. Such changes can result in changes to the efficacy of radiative transmission of the radio-frequency signals generated by the signal generator. Such changes to the efficacy of radiative transmission can be indicative changes in the health of the magnetic speed probe. Thus, the inductive coil is used for two purposes: i) as a sensing element configured to sense changes in the magnetic field; and ii) as a radio transmitter configured to transmit a signal indicative of health of the magnetic speed probe.

Figure 1A:
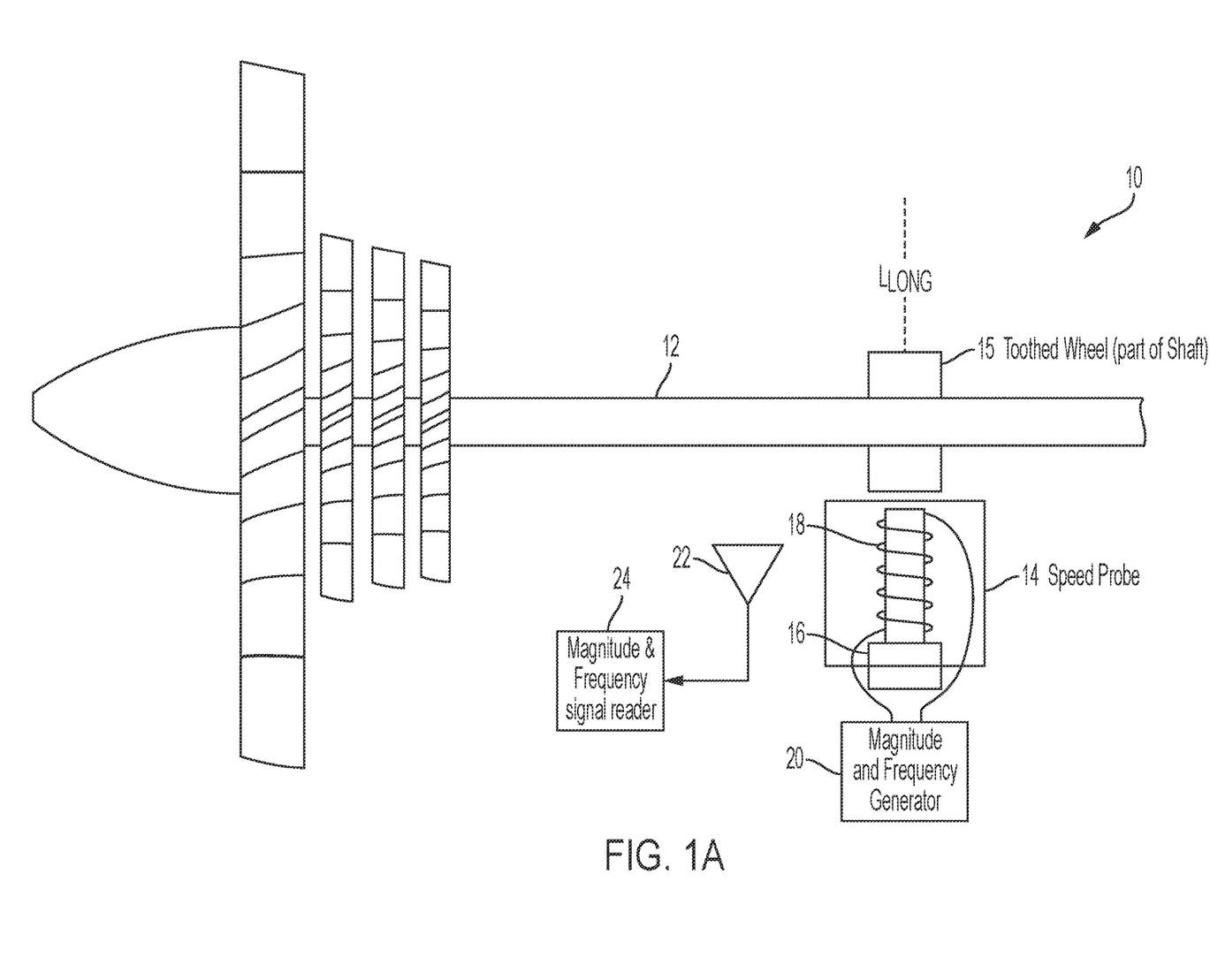
FIGS. 1A-1B are schematic diagrams of a turbojet engine equipped with different embodiments of a health-monitoring magnetic speed probe.

FIG. 1A is a schematic diagram of a turbojet engine equipped with an embodiment of a health-monitoring magnetic speed probe. In FIG. 1A, aircraft engine 10 has shaft 12 which rotates at a rotational frequency that is sensed by health-monitoring magnetic speed probe 14. Affixed to shaft 12 is a toothed wheel 15 at a longitudinal location $L_{LONG}$ along shaft 12. Health-monitoring magnetic speed probe 14 includes permanent magnet 16, inductive coil 18, signal generator 20, antenna 22, radio receiver 24, and health monitor 26. Permanent magnet 16 is located proximate a core of inductive coil 18, which is directed at longitudinal location $L_{LONG}$ along shaft 12. Every rotation of shaft 12, every tooth of toothed wheel 15 will traverse through a directional path of inductive coil 18 (or proximate inductive coil 18), thereby causing changes in the magnetic field proximate inductive coil 18. Such changes in the magnetic field proximate inductive coil 18 then induces a current within inductive coil 18. This induced current in inductive coil 18 is indicative of such a traversal by toothed wheel 15. A frequency of such traversals, as indicated by the induced currents caused thereby, is indicative of rotational frequency of shaft 12.

Health-monitoring of magnetic speed probe 14 is performed by monitoring changes to radio-frequency signals (e.g., frequency and/or magnitude) radiatively transmitted by inductive coil 18. Signal generator 20 generates radio-frequency signals, which are conducted by the inductive coil. Conduction of these radio-frequency signals causes inductive coil 18 to act as a radio transmitter by radiatively transmitting the radio-frequency signals. Antenna 22 is located so as to sense the radio-frequency signals radiatively transmitted by inductive coil 18. In some configurations, antenna 22 is shielded so as to be insensitive to any spurious radio-frequency signals not radiatively transmitted by inductive coil 18. Radio receiver 24 is conductively coupled to antenna 22 so as to receive the radio-frequency signals received thereby. Various metrics of the radio-frequency signals received can be used to indicate health of magnetic speed probe 14, as will be described in more detail below. As described above, inductive coil 18 is used for two purposes: i) to sense a rotating magnet affixed to a shaft for determining rotational speed of the shaft; and ii) to radiatively transmit radio-frequency signals for determining the health of the magnetic speed probe. Although FIG. 1 depicts a health-monitoring magnetic speed probe configured to measure rotational frequency of an aircraft engine, such a health-monitoring magnetic speed probe can be used in various other applications as well.

Figure 1B:
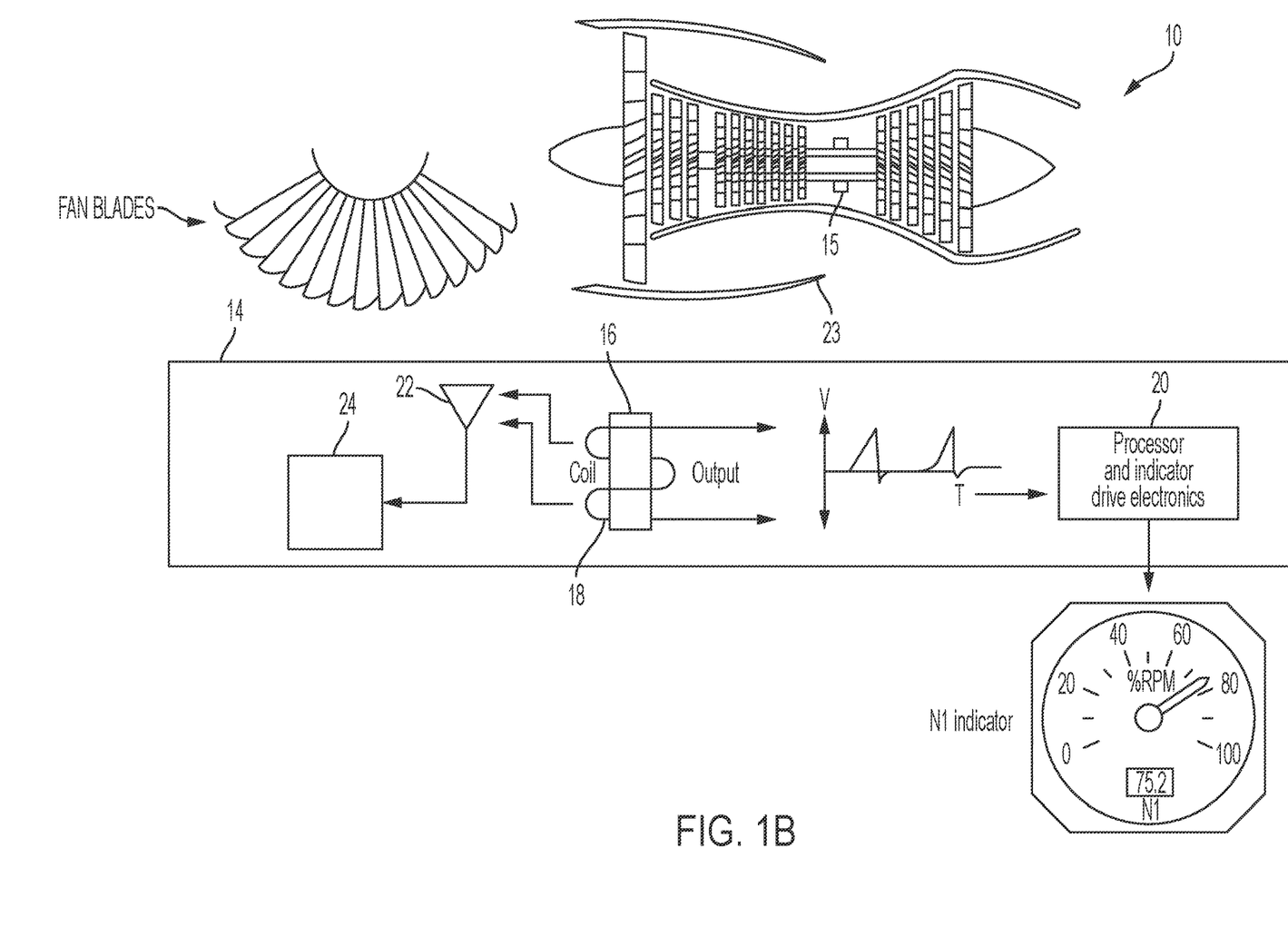

FIG. 1B is a schematic diagram of a turbojet engine equipped with another embodiment of a health-monitoring magnetic speed probe. In FIG. 1B, health-monitoring magnetic speed probe 14' differs from health-monitoring magnetic speed probe 14, which is depicted in FIG. 1A. Instead of permanent magnet 16 being mounted proximate inductive core 18, as shown in the FIG. 1A embodiment, permanent magnet 16' is functions as the core of inductive coil 18. In some embodiments, permanent magnet 16' and inductive coil 18 are statically mounted in nacelle 23 of aircraft engine 10. In the FIG. 1B depicted embodiment, health-monitoring magnetic speed probe is aligned with toothed wheel 15 such that inductive coil 18 senses changes in a magnetic field caused by relative proximity of toothed wheel 15 with respect to permanent magnet 16'. Toothed wheel 15 has a magnetic permeability that is different from the magnetic permeability of free space. Thus, as toothed wheel 15 sweeps past permanent magnet 16', the teeth will cause changes in the magnetic field generated by permanent magnet 16'. These changes to the magnetic field will induce a coil current within inductive coil 18. Because there is an integer number of teeth distributed about shaft 12, every rotation of shaft 12 will result in the integer number of magnetic field changes, as each of the teeth of toothed wheel 15 sweeps past inductive coil 18. Thus, a frequency of the periodic coil current induced will be proportional to the rotational frequency of shaft 12.

In other embodiments the magnet is coupled to a rotating member instead of being coupled to a non-rotating member (as depicted in the FIGS. 1A and 1B embodiments). The rotating magnet then causes a changing magnetic field proximate inductive coil 18. In each of these described embodiments, inductive coil 18 is used for the two purposes disclosed above: i) to sense a rotating magnet affixed to a shaft for determining rotational speed of the shaft; and ii) to radiatively transmit radio-frequency signals for determining the health of the magnetic speed probe. In either embodiment, a minimum frequency of the radio-frequency signals radiatively transmitted by inductive coil 18 is greater than a maximum frequency of the current induced in inductive coil 18 via changes in the magnetic field of the magnet caused by rotation of the rotatable member. Such disparate frequencies can permit simultaneous operation of determining rotation frequency and health monitoring. In some embodiments, a ratio of the minimum frequency of the radio-frequency signals to the maximum frequency of the signal indicative of rotation frequency of the rotatable member is greater than 10:1, 100:1, 1000:1, or more.

Figure 2:
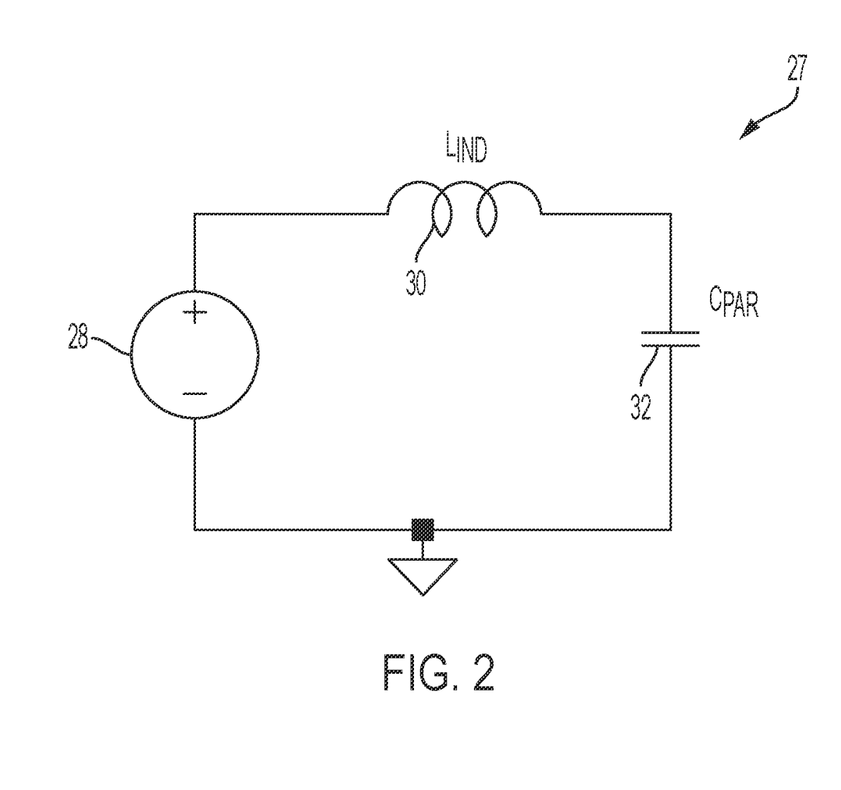
FIG. 2 is an equivalent circuit of an inductive coil of a magnetic speed probe.

FIG. 2 is an equivalent circuit of an inductive coil of a magnetic speed probe. In FIG. 2, equivalent circuit 27 is used to describe health monitoring of magnetic speed probe 14 can be performed. Equivalent circuit 27 includes power source 28, inductor 30, and capacitor 32. Power source 28 is a schematic model for signal generator 20. Inductor 30 is a schematic mode of the inductance of inductive coil 18. Capacitor 32 is a schematic model of the parasitic capacitance associated with inductive coil 18 and any other parasitic capacitances of a circuit including inductive coil 18 and signal generator 20. The inductance $L_{IND}$ of inductor 30 is given by:

$$L_{IND} = N^2 \mu_0 \mu_r \left(\frac{D}{2}\right)\left[\ln\left(\frac{8D}{d}\right) - 2\right], \quad (1)$$

where: N is the number of turns of the inductive coil; $\mu_0$ is the permeability of free space; $\mu_r$ is the relative permeability of a magnetic core, about which inductive coil is turned; D is the diameter of the magnetic core; and d is the wire diameter. The parasitic capacitance $C_{PAR}$ is, at least in part, a result of the capacitance between adjacent turns of the inductive coil.

Such a circuit as equivalent circuit 27 is sometimes called a resonant tank circuit. Equivalent circuit 27 has various characteristics that can be measured and characterize the circuit. For example, equivalent circuit 27 has a resonant frequency. Such resonant frequency of tank circuit 26 is given by:

$$f_0 = \frac{1}{2\pi\sqrt{L_{IND}C_{PAR}}}. \quad (2)$$

Any changes to either the parasitic capacitance $C_{PAR}$ or to the inductance $L_{IND}$ of the inductive coil will result in a change to the resonant frequency $f_0$ of equivalent circuit 27. Thus, resonant frequency $f_0$ can be used as a metric of health of inductive coil 18.

For example, signal generator 20 (as depicted in FIG. 1) can generate a frequency sweep of radio-frequency signals (for example sinusoids) about a nominal resonant frequency $f_0$. For example, signal generator 20 can generate a frequency sweep of radio-frequency signals from a frequency minimum $f_{min} < f_0$ to a frequency maximum $f_{max} > f_0$. In The range of frequencies $f_{min} < f_{sweep} < f_{max}$ of the frequency sweep of radio-frequency signals can be such that a frequency ration $f_{max}/f_{min}$ is greater than 1.2, 1.5, 2.0 or more.

A health monitor, such as health monitor 26 depicted in FIG. 1, can generate a signal indicative of health of magnetic speed probe 14. Such a signal can be generated based on one or more metrics of the radio-frequency signals received by radio receiver 24, such as, for example, the resonant frequency $f_0$. In some embodiments, the resonant frequency $f_0$ determined is compared with a reference resonant frequency $f_{0-ref}$. The reference resonant frequency $f_{0-ref}$ can be a resonant frequency determined at a prior time, such as, for example, a time of calibration or a time of first operation. In some embodiments, if the resonant frequency is not found to be within the range of frequencies $f_{min} < f_{sweep} < f_{max}$ of the frequency sweep, a signal indicative of such a condition is generated. In some embodiments, amplitude $A_{res}$ at resonant frequency $f_0$ is used as a metric of health of the magnetic speed probe. Such an amplitude $A_{res}$ can then compared with a reference amplitude $A_{res-ref}$. In some embodiments, amplitude $A_{test}$ of the radio-frequency signals is measured at a single test frequency $f_{test}$. Again, such an amplitude is then compared with a reference amplitude $A_{test-ref}$.

Various other metrics can be used, as well as various other radio-frequency signals. For example, instead of generating a frequency sweep of radio-frequency signals, a metric of health of magnetic speed probe 14 can be obtained using time domain methods. In such embodiments, signal generator can generate pulses, which include various high-frequency signal components, to be radiatively transmitted by inductive coil 18. Such pulses radiatively transmitted by inductive coil 18 are then received by antenna 22 and sensed by radio receiver 24. Various metrics, such as, for example, pulse amplitude $A_{pulse}$, pulse width $W_{pulse}$, etc., of the pulses received by antenna 22 and sensed by radio receiver 24 can be used as metrics of the health of magnetic speed sensor 14. Such time domain metrics contain much of the same information as the frequency domain metrics described above, and so can be used as an alternate way of obtaining health metrics.

Figure 3A:
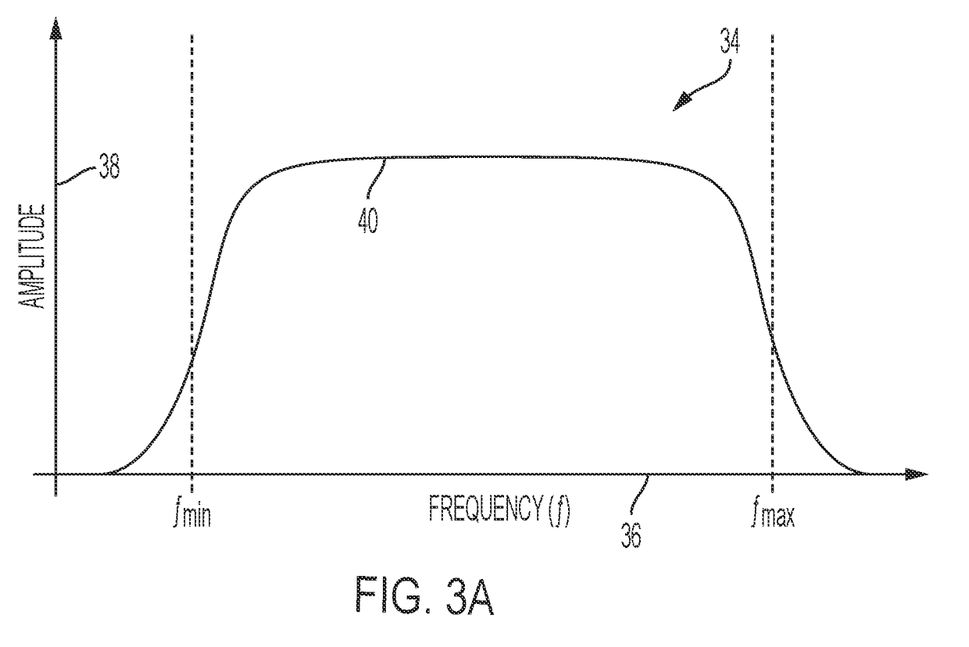
FIGS. 3A and 3B are graphs of radiatively transmitted and received radio-frequency signals of a health-monitoring magnetic speed probe.

FIGS. 3A and 3B are graphs of radiatively transmitted and received radio-frequency signals of a health-monitoring magnetic speed probe, respectively. In FIG. 3A, graph 34 includes horizontal axis 36, vertical axis 38 and amplitude-frequency relation 40. Horizontal axis 36 is indicative of frequency of a frequency sweep or radio frequency signals transmitted by inductive coil 18 of magnetic speed probe 14. Vertical axis 38 is indicative of amplitudes of radio frequency signals of the frequency sweep transmitted by inductive coil 18. In the depicted embodiment, the amplitudes of the frequency sweep or radio frequency signals is constant between a minimum frequency $f_{min}$ and a maximum frequency $f_{max}$. Such amplitudes need not be constant, however, for health monitoring of magnetic speed probe 14 as will be described below.

Figure 3B:
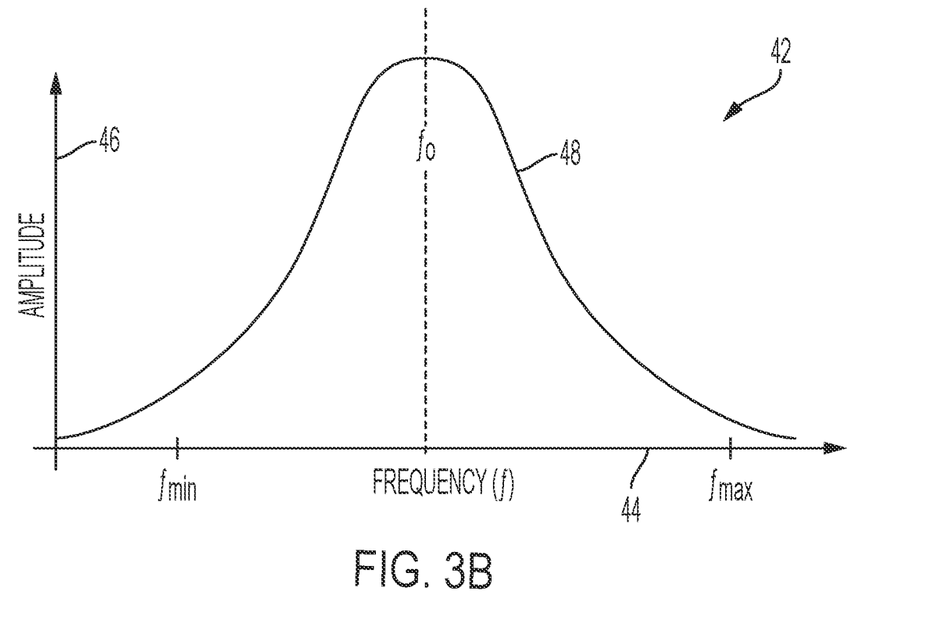

In FIG. 3B, graph 42 includes horizontal axis 44, vertical axis 46 and amplitude-frequency relation 48. Horizontal axis 44 is indicative of frequency of radio frequency signals sensed by radio receiver 24. Vertical axis 38 is indicative of amplitudes of the radio frequency signals as sensed by radio receiver 24. In the depicted embodiment, the amplitudes of the frequency sweep depict a resonant frequency $f_0$ between the minimum frequency $f_{min}$ and the maximum frequency $f_{max}$ of the frequency sweep of radio frequency signals transmitted by inductive coil 18. In embodiments, in which the amplitudes of the frequency sweep or radio frequency signals is constant between a minimum frequency $f_{min}$ and a maximum frequency $f_{max}$, a ratio $A_{sense}/A_{transmit}$ of the amplitudes sensed by radio receiver 24 to the amplitude transmitted by inductive coil 18 can be indicative of the resonant frequency $f_0$. In such embodiments that ratio $A_{sense}(f_0)/A_{transmit}(f_0)$ of amplitudes at the resonant frequency $f_0$ can be indicative of health of magnetic speed sensor 14.

Figure 4:
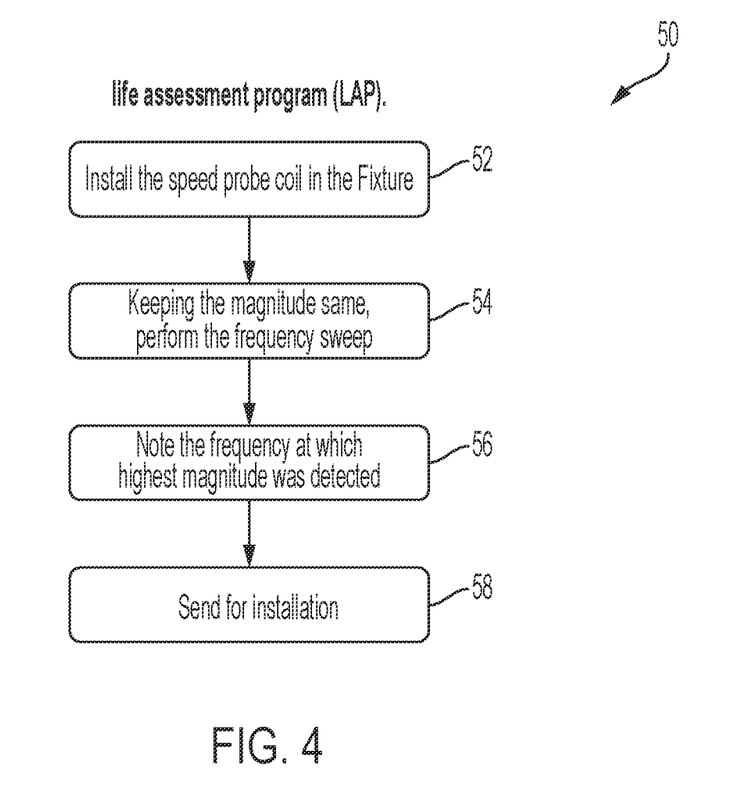
FIG. 4 is a flowchart of a method of health-monitoring of a magnetic speed probe.

FIG. 4 is a flowchart of a method of health-monitoring of a magnetic speed probe. In FIG. 4, method 50 begins at step 52, where a magnetic speed probe, such as magnetic speed probe 14, depicted in FIG. 1, is installed in a calibration or test fixture. Then, at step 54, the signal generator generates a frequency sweep of radio-frequency signals. In the depicted embodiment, the amplitudes of the radio-frequency signals of the frequency sweep are kept constant. The health monitor (or the radio receiver) can then determine the frequency at which the amplitude is maximum of the frequency sweep, as sensed by the radio receiver. This frequency determined to be maximum can be compared with a reference frequency. If the sensed frequency at which the maximum amplitude is determined to be within a predetermined frequency range about a reference frequency, then method 50 proceeds to step 58, where the magnetic speed probe is sent to installation in a product. If, however, the sensed frequency at which the maximum amplitude is determined to be not within a predetermined frequency range about a reference frequency, then the magnetic speed probe can be sent to repair.

Discussion of Possible Embodiments

The following are non-exclusive descriptions of possible embodiments of the present invention.

Apparatus and associated methods relate to a health-monitoring system for determining rotation frequency of a rotatable member. The system includes a magnetic speed probe and a speed-probe monitor. The magnetic speed probe includes a magnet, an inductive coil, and a sensing circuit. The magnet generates a magnetic field proximate the rotatable member. Rotation of the rotatable member causes changes in the magnetic field generated by the magnet. The inductive coil is positioned proximate the rotatable member. The changes in the magnetic field induces a coil current within the inductive coil. The sensing circuit is coupled to the inductive coil. The sensing system generates, in response to the coil current, a signal indicative of rotation frequency of the rotatable member. The speed-probe monitor includes a signal generator, a radio receiver, and a health monitor. The signal generator is coupled to the inductive coil of the magnetic speed probe. The signal generator generates radio-frequency signals that, when conducted by the inductive coil, causes the inductive coil to act as a radio transmitter that radiatively transmits the radio-frequency signals. The radio receiver receives the radio-frequency signals radiatively transmitted by the inductive coil. The health monitor determines health of the magnetic speed probe based on the radio-frequency signals received.

The system of the preceding paragraph can optionally include, additionally and/or alternatively, any one or more of the following features, configurations and/or additional components:

A further embodiment of the foregoing system, wherein the magnet can be a permanent magnet.

A further embodiment of any of the foregoing systems, wherein the magnet can be an electro-magnet.

A further embodiment of any of the foregoing systems, wherein the magnet can be mounted to the rotatable member.

A further embodiment of any of the foregoing systems, wherein the magnet can be mounted to a non-rotatable member proximate the rotatable member.

A further embodiment of any of the foregoing systems, wherein a minimum frequency of the radio-frequency signals can be greater than a maximum frequency of the signal indicative of rotation frequency of the rotatable member.

A further embodiment of any of the foregoing systems, wherein a ratio of the minimum frequency of the radio-frequency signals to the maximum frequency of the signal indicative of rotation frequency of the rotatable member can be greater than 10:1.

A further embodiment of any of the foregoing systems, wherein the speed-probe monitor can further include an antenna coupled to the radio receiver and aligned with the inductive coil so as to receive the radio-frequency signals radiatively transmitted by the inductive coil.

A further embodiment of any of the foregoing systems, wherein the radio-frequency signals generated by the signal generator can include a frequency sweep of radio-frequency signals.

A further embodiment of any of the foregoing systems, wherein the health monitor can further determine a plurality of amplitudes at a corresponding plurality of frequencies of the radio-frequency signals received.

A further embodiment of any of the foregoing systems, wherein the health monitor can further determine a maximum amplitude of the plurality of amplitudes determined.

A further embodiment of any of the foregoing systems, wherein the health monitor can further compare the maximum amplitude to a reference amplitude.

A further embodiment of any of the foregoing systems, wherein the health monitor can further determine a resonant frequency of the magnetic speed probe.

A further embodiment of any of the foregoing systems, wherein the health monitor can further make a frequency comparison between the resonant frequency to a reference frequency.

A further embodiment of any of the foregoing systems, wherein the health monitor can generate a signal indicative of maintenance needed in response to the health determined.

A further embodiment of any of the foregoing systems

Some embodiments relate to a health-monitoring method for determining rotation frequency of a rotatable member. The method generates, via a magnet, a magnetic field proximate the rotatable member. The method causes, via rotation of the rotatable member, changes in the magnetic field generated by the magnet. The method positions an inductive coil proximate the rotatable member so as to sense changes in the magnetic field. The method induces, via the changes in the magnetic field sensed, a coil current within the inductive coil. The method generates, in response to the coil current induced, a signal indicative of the rotation frequency of the rotatable member. The method generates, via a signal generator coupled to the inductive coil, radio-frequency signals that, when conducted by the inductive coil, causes the inductive coil to act as a radio transmitter that radiatively transmits the radio-frequency signal. The method receives, via a radio receiver, the radio-frequency signals radiatively transmitted by the inductive coil. The method also determines, via a health monitor, health of the magnetic speed probe based on the radio-frequency signals received.

The method of the preceding paragraph can optionally include, additionally and/or alternatively, any one or more of the following features, configurations and/or additional components:

A further embodiment of the foregoing method can further include receiving, via an antenna coupled to the radio receiver and aligned with the inductive coil, the radio-frequency signals radiatively transmitted by the inductive coil.

A further embodiment of any of the foregoing methods, wherein generating, via a signal generator coupled to the inductive coil of the magnetic speed probe, radio-frequency signals can include generating a frequency sweep of radio-frequency signals.

A further embodiment of any of the foregoing methods can further include determining, via the health monitor, a resonant frequency of the magnetic speed probe.

A further embodiment of any of the foregoing methods can further include making, via the health monitor, a frequency comparison between the resonant frequency to a reference frequency.

A further embodiment of any of the foregoing methods can further include generating, via the health monitor, a signal indicative of maintenance needed in response to the frequency comparison.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for a sensing rotation frequency of a rotatable member and for monitoring health thereof, the system comprising:
   a magnetic speed probe including:
      a magnet for generating a magnetic field proximate the rotatable member, rotation of the rotatable member causing changes in the magnetic field generated by the magnet;
      an inductive coil positioned proximate the rotatable member, the changes in the magnetic field inducing a coil current within the inductive coil; and
      a sensing circuit coupled to the inductive coil, the sensing circuit generating, in response to the coil current, a signal indicative of the rotation frequency of the rotatable member; and
   a speed-probe monitor including:
      a signal generator coupled to the inductive coil of the magnetic speed probe, the signal generator generating radio-frequency signals that, when conducted by the inductive coil, causes the inductive coil to act as a radio transmitter that radiatively transmits the radio-frequency signals;

a radio receiver that receives the radio-frequency signals radiatively transmitted by the inductive coil; and a health monitor that determines health of the magnetic speed probe based on the radio-frequency signals received.

2. The health-monitoring system of claim 1, wherein the magnet is a permanent magnet.

3. The health-monitoring system of claim 1, wherein the magnet is an electro-magnet.

4. The health-monitoring system of claim 1, wherein the magnet is mounted to the rotatable member.

5. The health-monitoring system of claim 1, wherein the magnet is mounted to a non-rotatable member proximate the rotatable member.

6. The health-monitoring system of claim 1, wherein a minimum frequency of the radio-frequency signals is greater than a maximum frequency of the signal indicative of rotation frequency of the rotatable member.

7. The health-monitoring system of claim 6, wherein a ratio of the minimum frequency of the radio-frequency signals to the maximum frequency of the signal indicative of rotation frequency of the rotatable member is greater than 10:1.

8. The health-monitoring system of claim 1, wherein the speed-probe monitor further includes:

an antenna coupled to the radio receiver and aligned with the inductive coil so as to receive the radio-frequency signals radiatively transmitted by the inductive coil.

9. The health-monitoring system of claim 1, wherein the radio-frequency signals generated by the signal generator comprise a frequency sweep of radio-frequency signals.

10. The health-monitoring system of claim 9, wherein the health monitor further determines a plurality of amplitudes at a corresponding plurality of frequencies of the radio-frequency signals received.

11. The health-monitoring system of claim 10, wherein the health monitor further determines a maximum amplitude of the plurality of amplitudes determined.

12. The health-monitoring system of claim 11, wherein the health monitor further compares the maximum amplitude to a reference amplitude.

13. The health-monitoring system of claim 9, wherein the health monitor further determines a resonant frequency of the magnetic speed probe.

14. The health-monitoring system of claim 13, wherein the health monitor further makes a frequency comparison between the resonant frequency to a reference frequency.

15. The health-monitoring system of claim 1, wherein the health monitor generates a signal indicative of maintenance needed in response to the health determined.

16. A method for a sensing rotation frequency of a rotatable member and for monitoring health thereof, the method comprising:

generating, via a magnet, a magnetic field proximate the rotatable member;

causing, via rotation of the rotatable member, changes in the magnetic field generated by the magnet;

positioning an inductive coil proximate the rotatable member so as to sense changes in the magnetic field;

inducing, via the changes in the magnetic field sensed, a coil current within the inductive coil;

generating, in response to the coil current induced, a signal indicative of the rotation frequency of the rotatable member;

generating, via a signal generator coupled to the inductive coil, radio-frequency signals that, when conducted by the inductive coil, causes the inductive coil to act as a radio transmitter that radiatively transmits the radio-frequency signals;

receiving, via a radio receiver, the radio-frequency signals radiatively transmitted by the inductive coil; and determining, via a health monitor, health of a magnetic speed probe based on the radio-frequency signals received.

17. The health-monitoring method of claim 16, further including:

receiving, via an antenna coupled to the radio receiver and aligned with the inductive coil, the radio-frequency signals radiatively transmitted by the inductive coil.

18. The health-monitoring method of claim 16, wherein generating, via a signal generator coupled to the inductive coil of the magnetic speed probe, radio-frequency signals comprises:

generating a frequency sweep of radio-frequency signals.

19. The health-monitoring method of claim 16, further comprising:

determining, via the health monitor, a resonant frequency of the magnetic speed probe.

20. The health-monitoring method of claim 19, further comprising:

making, via the health monitor, a frequency comparison between the resonant frequency to a reference frequency; and generating, via the health monitor, a signal indicative of maintenance needed in response to the frequency comparison.

* * * * *